US011618450B1

(12) United States Patent
Knueven et al.

(10) Patent No.: US 11,618,450 B1
(45) Date of Patent: Apr. 4, 2023

(54) REMEDIAL ACTION FOR SECURING VEHICLE DURING LOSS OF FRICTION BRAKES AT STOP

(71) Applicant: GM GLOBAL TECHNOLOGY OPERATIONS LLC, Detroit, MI (US)

(72) Inventors: Jacob Knueven, Southfield, MI (US); Jason C Jousma, Holly, MI (US); Helen M Rieland, Troy, MI (US); Alexandre O. Korobkine, Livonia, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/456,139

(22) Filed: Nov. 22, 2021

(51) Int. Cl.
*B60T 8/92* (2006.01)
*B60T 17/22* (2006.01)
*B60W 30/18* (2012.01)
*B60W 10/196* (2012.01)
*B60W 10/08* (2006.01)

(52) U.S. Cl.
CPC ......... *B60W 30/18136* (2013.01); *B60T 8/92* (2013.01); *B60T 17/221* (2013.01); *B60W 10/08* (2013.01); *B60W 10/196* (2013.01); *B60T 2270/406* (2013.01); *B60W 2510/18* (2013.01); *B60W 2520/06* (2013.01); *B60W 2710/083* (2013.01); *B60W 2710/1005* (2013.01)

(58) Field of Classification Search
CPC ........... B60W 30/18136; B60W 10/08; B60W 10/196; B60W 2510/18; B60W 2520/06; B60W 2710/1005; B60T 8/92; B60T 17/221; B60T 2270/406
See application file for complete search history.

(56) References Cited

U.S. PATENT DOCUMENTS

| | | | | |
|---|---|---|---|---|
| 6,338,398 | B1 * | 1/2002 | Eguchi ................... | B60T 7/122 188/134 |
| 6,358,182 | B1 * | 3/2002 | Eguchi ............ | B60W 30/18063 903/918 |
| 6,370,466 | B1 * | 4/2002 | Hada ....................... | B60T 7/122 701/84 |
| 6,590,299 | B2 * | 7/2003 | Kuang .................... | B60L 50/61 290/40 C |
| 9,283,962 | B2 * | 3/2016 | Nakaso ........... | B60W 30/18054 |
| 9,352,741 | B2 * | 5/2016 | Wise ................... | B60W 10/184 |

\* cited by examiner

*Primary Examiner* — Tisha D Lewis
(74) *Attorney, Agent, or Firm* — Lorenz & Kopf LLP

(57) ABSTRACT

Methods and systems are for securing a vehicle. In an exemplary embodiment, the vehicle includes a body, a drive system, a braking system, and a processor. The drive system is configured to generate movement of the body, and includes a motor. The braking system includes friction brakes that provide friction braking. The processor is disposed onboard the vehicle, coupled to the motor, and is configured to at least facilitate: determining that a loss in friction braking has occurred while the vehicle is being stopped; and providing instructions to the motor for providing propulsion torque, thereby securing the vehicle at a stop, when it is determined that the loss in friction braking has occurred; wherein the motor is further configured to execute the instructions provided by the processor for providing the propulsion torque.

20 Claims, 2 Drawing Sheets

REMEDIAL ACTION FOR SECURING VEHICLE DURING LOSS OF FRICTION BRAKES AT STOP

INTRODUCTION

The technical field generally relates to vehicles and, more specifically, to methods and systems for securing a vehicle during a vehicle stop when there is a loss of friction brakes.

Certain vehicles today include systems for securing a vehicle at a stop. However, such existing vehicle systems may not always provide optimal securing of the vehicle when a loss of friction braking occurs, for example with the vehicle is disposed on a hill or other type of grade.

Accordingly, it is desirable to provide improved methods and systems for securing a vehicle at a stop, including when a loss of friction braking has occurred. Furthermore, other desirable features and characteristics of the present disclosure will become apparent from the subsequent detailed description and the appended claims, taken in conjunction with the accompanying drawings and the foregoing technical field and background.

SUMMARY

In an exemplary embodiment, a method is provided for securing a vehicle, the method including: determining, via a processor, that a loss in friction braking has occurred while the vehicle is being stopped; and providing propulsion torque using a motor of the vehicle in accordance with instructions provided by the processor, thereby securing the vehicle at a stop, when it is determined that the loss in friction braking has occurred.

Also in an exemplary embodiment: the step of determining that the loss in friction braking has occurred includes determining that communications have been lost with a braking system of the vehicle while the vehicle is being stopped; and the step of providing the propulsion torque includes providing the propulsion torque using the motor of the vehicle in accordance with the instructions provided by the processor, thereby securing the vehicle at the stop, when it is determined that the communications have been lost with the braking system.

Also in an exemplary embodiment, the steps of the method are implemented in connection with the braking system of a vehicle with one-pedal driving.

Also in an exemplary embodiment, the method further includes: determining, via the processor, whether the vehicle is being held at a stop; and allowing a driver of the vehicle to override an automated control action of the vehicle upon request of the drive when the vehicle is not being held at a stop.

Also in an exemplary embodiment, the method further includes: determining, via the processor, whether the vehicle was previously secured by friction brakes; and automatically shifting a park system of the vehicle to a park gear, in accordance with instructions provided by the processor, when it is determined that both: the vehicle is being held at a stop; and the vehicle was not previously secured by the friction brakes.

Also in an exemplary embodiment, the method further includes: determining, via the processor, whether a park system of the vehicle is in a park gear; determining, via the processor, whether the vehicle is rolling; and when the park system is not in the park gear and the vehicle is not rolling, maintaining a current level of propulsion torque from the motor, via instructions provided by the processor, until the park system is in the park gear.

Also in an exemplary embodiment, the method further includes: when the park system is not in the park gear and the vehicle is rolling, adding propulsion torque from the motor, via instructions provided by the processor, until the vehicle comes to a stop and the park system is in the park gear.

Also in an exemplary embodiment, the method further includes: determining a direction in which the vehicle is rolling; when the park system is not in the park gear and the vehicle is rolling backwards, adding positive propulsion torque from the motor, via instructions provided by the processor, until the vehicle comes to a stop and the park system is in the park gear; and when the park system is not in the park gear and the vehicle is rolling forward, adding negative propulsion torque from the motor, via instructions provided by the processor, until the vehicle comes to a stop and the park system is in the park gear.

In another exemplary embodiment, a system is provided that includes a motor and a processor. The processor is coupled to the motor, and is configured to at least facilitate: determining that a loss in friction braking has occurred while the vehicle is being stopped; and providing instructions to the motor for providing propulsion torque, thereby securing the vehicle at a stop, when it is determined that the loss in friction braking has occurred; wherein the motor is further configured to execute the instructions provided by the processor for providing the propulsion torque.

Also in an exemplary embodiment, the processor is configured to at least facilitate: determining that communications have been lost with a braking system of the vehicle while the vehicle is being stopped; and providing the instructions to the motor for providing the propulsion torque, thereby securing the vehicle at the stop, when it is determined that the communications have been lost with the braking system.

Also in an exemplary embodiment, the processor is configured to at least facilitate: determining whether the vehicle is being held at a stop; and allowing a driver of the vehicle to override an automated control action of the vehicle upon request of the drive when the vehicle is not being held at a stop.

Also in an exemplary embodiment, the processor is configured to at least facilitate: determining whether the vehicle was previously secured by friction brakes; and automatically shifting a park system of the vehicle to a park gear when it is determined that both: the vehicle is being held at a stop; and the vehicle was not previously secured by the friction brakes.

Also in an exemplary embodiment, the processor is configured to at least facilitate: determining whether a park system of the vehicle is in a park gear; determining whether the vehicle is rolling; and when the park system is not in the park gear and the vehicle is not rolling, providing instructions to the motor for maintaining a current level of propulsion torque from the motor until the park system is in the park gear.

Also in an exemplary embodiment, the processor is configured to at least facilitate: when the park system is not in the park gear and the vehicle is rolling, providing instructions to the motor for adding propulsion torque until the vehicle comes to a stop and the park system is in the park gear.

Also in an exemplary embodiment, the processor is configured to at least facilitate: determining whether the vehicle is rolling backwards; when the park system is not in the park gear and the vehicle is rolling backwards, providing instructions to the motor for adding positive propulsion torque from the motor until the vehicle comes to a stop and the park system is in the park gear; and when the park system is not in the park gear and the vehicle is rolling forward, providing instructions to the motor for adding negative propulsion torque from the motor until the vehicle comes to a stop and the park system is in the park gear.

In another exemplary embodiment, a vehicle is provided that includes a body, a drive system, a braking system, and a processor. The drive system is configured to generate movement of the body, and includes a motor. The braking system includes friction brakes that provide friction braking. The processor is disposed onboard the vehicle, coupled to the motor, and is configured to at least facilitate: determining that a loss in friction braking has occurred while the vehicle is being stopped; and providing instructions to the motor for providing propulsion torque, thereby securing the vehicle at a stop, when it is determined that the loss in friction braking has occurred; wherein the motor is further configured to execute the instructions provided by the processor for providing the propulsion torque.

Also in an exemplary embodiment, the processor is further configured to at least facilitate: determining that communications have been lost with the braking system of the vehicle while the vehicle is being stopped; and providing the instructions to the motor for providing the propulsion torque, thereby securing the vehicle at the stop, when it is determined that the communications have been lost with the braking system.

Also in an exemplary embodiment, the processor is further configured to at least facilitate: determining whether the vehicle is being held at a stop; allowing a driver of the vehicle to override an automated control action of the vehicle upon request of the drive when the vehicle is not being held at a stop; determining whether the vehicle was previously secured by the friction brakes; and automatically shifting a park system of the vehicle to a park gear when it is determined that both: the vehicle is being held at a stop; and the vehicle was not previously secured by the friction brakes.

Also in an exemplary embodiment, the processor is further configured to at least facilitate: determining whether a park system of the vehicle is in a park gear; determining whether the vehicle is rolling; when the park system is not in the park gear and the vehicle is not rolling, providing instructions to the motor for maintaining a current level of propulsion torque from the motor until the park system is in the park gear; and when the park system is not in the park gear and the vehicle is rolling, providing instructions to the motor for adding propulsion torque until the vehicle comes to a stop and the park system is in the park gear.

Also in an exemplary embodiment, the processor is further configured to at least facilitate: determining whether the vehicle is rolling backwards; when the park system is not in the park gear and the vehicle is rolling backwards, providing instructions to the motor for adding positive propulsion torque from the motor until the vehicle comes to a stop and the park system is in the park gear; and when the park system is not in the park gear and the vehicle is rolling forward, providing instructions to the motor for adding negative propulsion torque from the motor until the vehicle comes to a stop and the park system is in the park gear.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
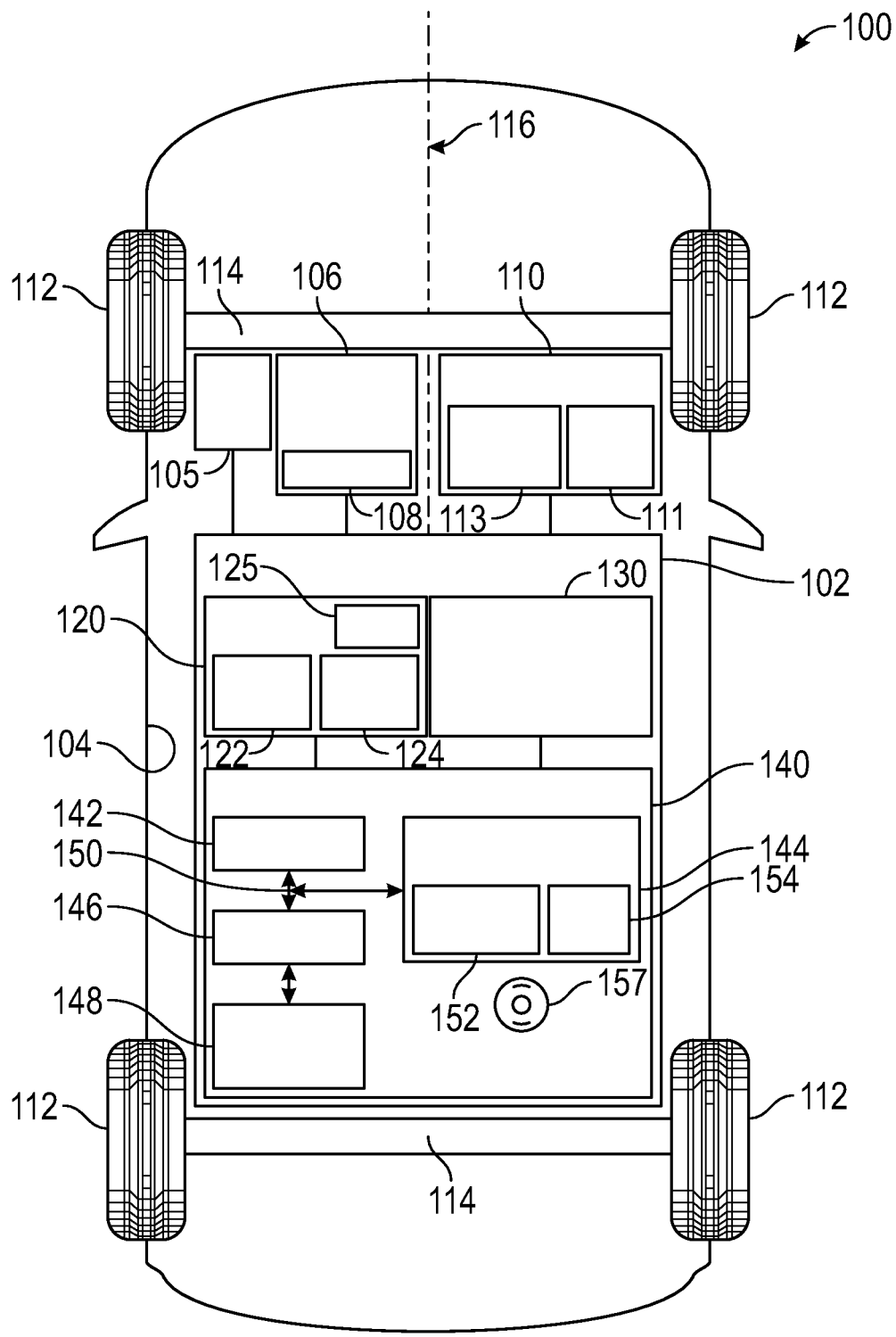
FIG. 1 is a functional block diagram of a vehicle that includes a control system for securing the vehicle at a stop, including when a loss of friction braking has occurred, in accordance with exemplary embodiments.

FIG. 1 illustrates a vehicle 100, according to an exemplary embodiment. As described in greater detail further below, the vehicle 100 includes a control system 102 that is configured for securing the vehicle 100 at a stop, including when a loss of friction braking has occurred, in accordance with exemplary embodiments.

In various embodiments, the vehicle 100 includes an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, such as aircraft, spacecraft, watercraft, and so on, and/or one or more other types of mobile platforms (e.g., a robot and/or other mobile platform).

The vehicle 100 includes a body 104 that is arranged on a chassis 116. The body 104 substantially encloses other components of the vehicle 100. The body 104 and the chassis 116 may jointly form a frame. The vehicle 100 also includes a plurality of wheels 112. The wheels 112 are each rotationally coupled to the chassis 116 near a respective corner of the body 104 to facilitate movement of the vehicle 100. In one embodiment, the vehicle 100 includes four wheels 112, although this may vary in other embodiments (for example for trucks and certain other vehicles).

A drive system 110 is mounted on the chassis 116, and drives the wheels 112, for example via axles 114. In various embodiments, the drive system 110 includes a motor 111 that drives the wheels 112 via the axles 114, and that also provides propulsion torque for automatic braking of the vehicle 100. In certain embodiments, the motor 111 includes an electric motor. In various other embodiments, one or more other types of motors 111 may also be including, such as a hybrid electric motor, an internal combustion engine/motor, and/or one or more other different types of motors.

Also as depicted in various embodiments, the drive system 110 also includes a park system 113. In various embodiments, the park system 113 can be automatically and/or manually shifted into different gears, such as drive (D), park (P), reverse (R), and so on.

In various embodiments, the vehicle 100 also includes a braking system 106. In various embodiments, the braking system 106 includes friction brakes 108 (also referred to herein as friction brake units 108) for causing the vehicle 100 to stop and to remain in a stopped position.

Also in various embodiments, the vehicle 100 includes, among other devices and systems, one or more input devices 105 through which a driver, operator, or other user may request one or more vehicle control actions. In various embodiments, the input devices 105 may include one or more accelerator and/or brake pedals, steering wheels, touch screens, control switches or knobs, and/or other types of input devices.

Figure 2:
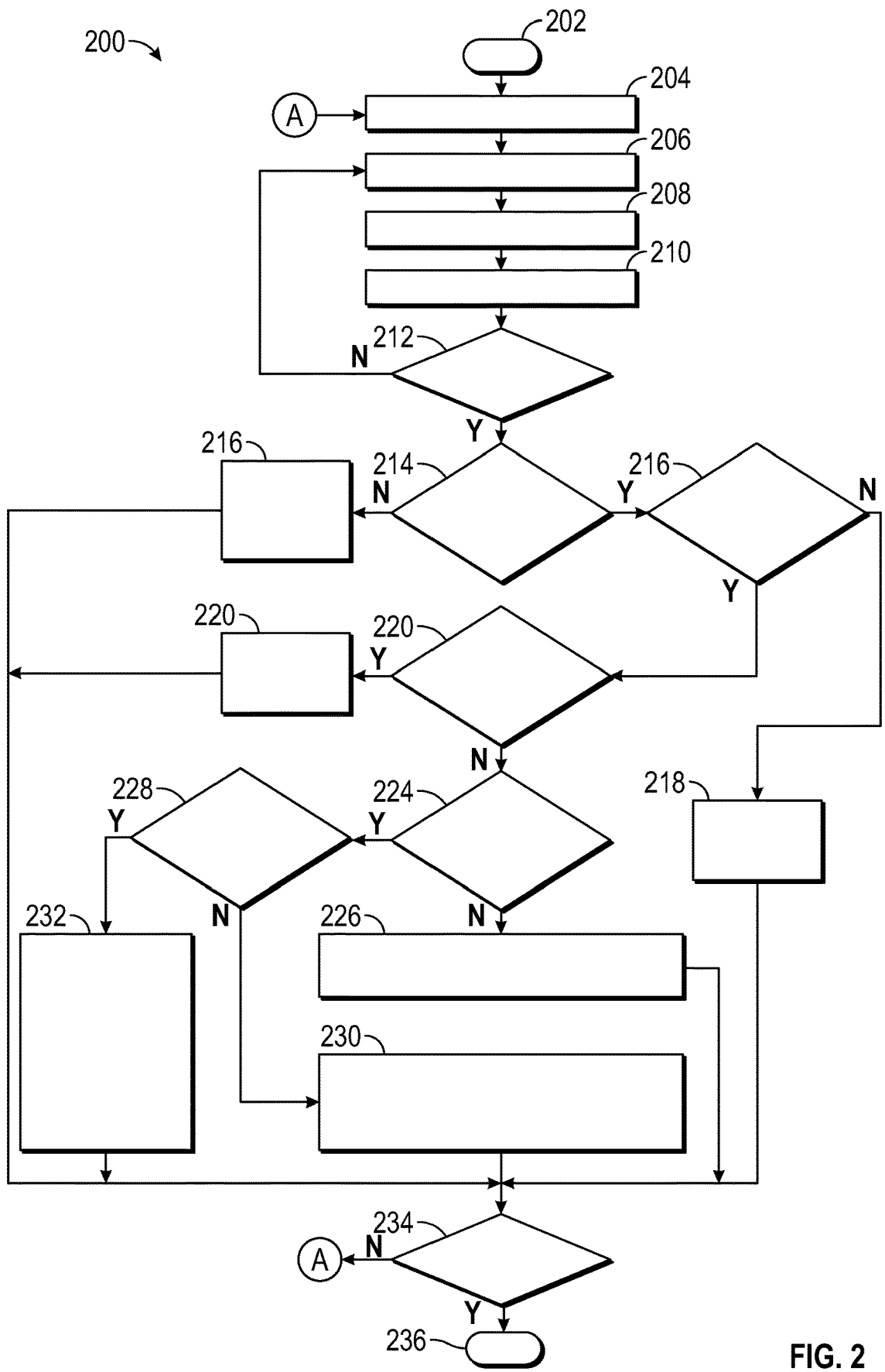
FIG. 2 is a flowchart of a process for securing a vehicle at a stop, including when a loss of friction braking has occurred, and that can be implemented in connection with the vehicle and control system of FIG. 1, in accordance with exemplary embodiments.

As noted above, the control system 102 is configured for securing the vehicle 100 at a stop, including when a loss of friction braking has occurred, in accordance with exemplary embodiments. In various embodiments, the control system 102 provides these functions in connection with the steps of the process 200 that are depicted in FIG. 2 and described further below in connection therewith.

As depicted in FIG. 1, in various embodiments, the control system 102 is coupled to the drive system 110, the braking system 106, and the input device 105. Also as depicted in FIG. 1, in various embodiments, the control system 102 includes a sensor array 120, one or more transceivers 130, and a controller 140.

In various embodiments, the sensor array 120 includes sensors that obtain sensor data for use in securing the vehicle 100, including when the vehicle 100 is stopped and there is a loss of friction brakes. In the depicted embodiment, the sensor array 120 includes wheel sensors 122, motor sensors 124, and input sensors 125.

In various embodiments, the wheel sensors 122 include one or more wheel speed sensors and/or other sensors coupled to one or more of the wheels 112 and configured to measure a movement, speed and/or velocity of the vehicle 100 and/or data used to calculate the movement, speed and/or velocity of the vehicle 100.

Also in various embodiments, the motor sensors 124 include one or more sensors coupled to the motor 111 and configured to measure a movement, speed and/or velocity of the motor 111 and/or data used to calculate the movement, speed and/or velocity of the motor 111.

Also in various embodiments, the input sensors 125 are coupled to one or more input devices 105 (e.g., an accelerator pedal, a brake pedal, a steering wheel, a control switch or knob, a touch screen, and so on), and are configured to detect a user's inputs as to requests for one or more vehicle actions (e.g., for braking or accelerating, and so on).

In various embodiments, the one or more transceivers 130 receive and transmit messages within the vehicle 100 and/or between the vehicle 100 and one or more other vehicles, remote servers, traffic lights, other infrastructure, and/or other entities outside the vehicle 100. In certain embodiments, the transceivers 130 receive (and/or transmit) wireless messages from (and/or to) the drive system 110, the braking system 106, the input device 105, and/or one or more other vehicle systems. In certain other embodiments, such communications may be instead performed via a vehicle CAN bus and/or one or more other wired communications systems.

In various embodiments, the controller 140 is coupled to the sensor array 120, transceiver 130 (if applicable), and provides instructions to and controls operation thereof. In various embodiments, the controller 140 is also coupled to, and configured to provide instructions to and control operation of, the drive system 110 and the braking system 106, and/or one or more other vehicle systems and/or components.

In various embodiments, the controller (or computer system) 140 controls vehicle operation, including securing the vehicle 100 while the vehicle 100 is stopped and a loss of friction braking occurs, including utilizing propulsion torque provided by the motor 111 in accordance with instructions provided thereto by the controller 140, based on processing performed by the controller 140 utilizing the sensor data and other data and/or information obtained via the control system 102. In various embodiments, the controller 140 provides these and other functions in accordance with the steps of the process 200 of FIG. 2.

In various embodiments, the controller 140 (and, in certain embodiments, the control system 102 itself) is disposed within the body 104 of the vehicle 100. In one embodiment, the control system 102 is mounted on the chassis 116. In certain embodiments, the controller 140 and/or control system 102 and/or one or more components thereof may be disposed outside the body 104, for example on a remote server, in the cloud, or other device where image processing is performed remotely.

It will be appreciated that the controller 140 may otherwise differ from the embodiment depicted in FIG. 1. For example, the controller 140 may be coupled to or may otherwise utilize one or more remote computer systems and/or other control systems, for example as part of one or more of the above-identified vehicle 100 devices and systems.

In the depicted embodiment, the computer system of the controller 140 comprises a computer system (also referred to herein as computer system 140), and includes a processor 142, a memory 144, an interface 146, a storage device 148, and a computer bus 150. The processor 142 performs the computation and control functions of the controller 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the controller 140 and the computer system of the controller 140, generally in executing the processes described herein, such as the process 200 discussed further below in connection with FIG. 2.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program 152 along with sorted values 154 for utilization in securing the vehicle 100 at a stop.

The bus 150 serves to transmit programs, data, status and other information or signals between the various components of the computer system of the controller 140. The interface 146 allows communication to the computer system of the controller 140, for example from a system driver and/or another computer system, and can be implemented using any suitable method and apparatus. In one embodiment, the interface 146 obtains the various data from the sensor array 120 and transceiver 130, among other possible data sources. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including various different types of direct access storage and/or other memory devices. In one exemplary embodiment, the storage device 148 comprises a program product from which memory 144 can receive a program 152 that executes one or more embodiments of one or more processes of the present disclosure, such as the steps of the process 200 discussed further below in connection with FIG. 2. In another exemplary embodiment, the program product may be directly stored in and/or otherwise accessed by the memory 144 and/or a disk (e.g., disk 157), such as that referenced below.

The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and park system media such as digital and analog communication links. It will be appreciated that cloud-based storage and/or other techniques may also be utilized in certain embodiments. It will similarly be appreciated that the computer system of the controller 140 may also otherwise differ from the embodiment depicted in FIG. 1, for example in that the computer system of the controller 140 may be coupled to or may otherwise utilize one or more remote computer systems and/or other control systems.

FIG. 2 is a flowchart of a process 200 for securing a vehicle at a stop, including when a loss of friction braking has occurred controlling movement of a vehicle with respect to timing of consecutive traffic lights, in accordance with exemplary embodiments. In various embodiments, the process 200 can be implemented in connection with the vehicle 100 and control system 102 of FIG. 1, and components thereof.

As depicted in FIG. 2, in various embodiments, the process 200 begins at step 202. In one embodiment, the process 200 begins when a vehicle drive or ignition cycle begins, for example when a driver approaches or enters the vehicle 100, or when the driver turns on the vehicle and/or an ignition therefor (e.g. by turning a key, engaging a keyfob or start button, and so on). In one embodiment, the steps of the process 200 are performed continuously during operation of the vehicle.

In various embodiments, inputs are obtained (step 204). In various embodiments, the inputs comprise driver inputs and/or other user inputs that are obtained via one or more input sensors 125 of FIG. 1 with respect to a driver or other user's engagement of one or more input devices 105 of FIG. 1. In certain embodiments and circumstances, the driver inputs includes a driver's request to stop the vehicle 100 based on the driver's engagement of a brake pedal and/or release of an accelerator pedal of the vehicle 100, among other possible inputs.

In various embodiments, the vehicle is stopped (step 206). In various embodiments, the vehicle 100 of FIG. 1 is stopped initially by instructions provided by the processor 142 of FIG. 1 for motor-supplied propulsion torque, which is then supplied by the motor 111 of FIG. 1 in order to bring the vehicle 100 to a stop (e.g., by applying the torque to the wheels 112 via the axles 114 of FIG. 1). Also in various embodiments, the braking is then continued (e.g., once the vehicle 100 is initially brought to a stop) via the braking system 106 of FIG. 1 (e.g., by application of friction brake units 108 thereof), also via instructions provided by the processor 142.

In various embodiments, the vehicle 100 of FIG. 1 is stopped in this manner (i.e., initially by the motor 111, and subsequently by friction brakes 108 of the braking system 106) in response to a user's (e.g., driver's) request via the user's engagement of an input device 105 (e.g., by stepping down on a brake pedal or releasing an accelerator pedal, or the like). In various embodiments, the vehicle 100 may also be stopped in this manner (i.e., initially by the motor 111, and subsequently by friction brakes 108 of the braking system 106) completely via automatic braking, in which the processor 142 automatically provides such instructions during an emergency braking event and/or one or more other automatic braking events.

Also in various embodiments, sensor data is obtained (step 208). In various embodiments, the sensor data is obtained with respect to movement of the wheels 112 and/or motor 111 of FIG. 1, and/or as to an amount of torque provided by the motor 111, as measured via one or more wheel sensors 122 and/or motor sensors 124, respectively, of FIG. 1. In certain embodiments, this sensor data is collected continuously throughout the steps of the process 200.

Also in various embodiments, communications are received from the braking system (step 210). In various embodiments, the communications are received by the processor 142 of FIG. 1 from the braking system 106 of FIG. 1 as to a current status of functioning of the brakes 108 (e.g., friction brake units of the braking system 106). In certain embodiments, such communications are transmitted and received via one or more wired systems, such as a CAN bus of the vehicle 100. In certain other embodiments, such communications are transmitted and received wireless via one or more transceivers 130 of FIG. 1. In various embodiments, the communications of step 210 are transmitted and received continuously as the vehicle 100 is held to a stop (e.g., as set forth above with respect to step 206).

Also in various embodiments, a determination is made as to whether an indication of a loss in friction braking has occurred (step 212). In various embodiments, such an indication may occur when communications of step 210 are not received (and/or cease in operation) from the braking system 106, and/or when communications otherwise indicate that the braking system 106 (e.g., the friction brake units 108 thereof) are not functioning properly. In various embodiments, this determination is made by the processor 142 of FIG. 1 based on the communications (and/or lack thereof and/or interruption thereof) of step 210.

In certain embodiments, when it is determined that no indication of a loss in friction braking has occurred, then it is determined that the braking system is working properly. In such event, the process then returns to step 206 (as depicted in FIG. 2), and the process proceeds with a continuing of step 206 (and subsequent steps, including steps 208-212) in a new iteration.

Conversely, when it is instead determined that an indication of a loss in friction braking has occurred, then it is determined that the braking system is not working properly. In such event, the process proceeds instead to step 214, described directly below.

During step 214, a determination is made as to whether the vehicle is being held at a stop. In various embodiments, during step 214 a determination is made as to whether a velocity of the vehicle 100 of FIG. 1 is equal to zero (or in certain embodiments, whether the velocity of the vehicle 100 is less than a predetermined threshold that is close to or approximately equal to zero). In various embodiments, this determination is made by the processor 142 of FIG. 1. based on sensor data obtained from one or more of the wheel sensors 122 and/or motor sensors 124 of FIG. 1 (e.g., as to whether the speed is equal to zero and/or less than a predetermined threshold that is stored in the memory 144 of FIG. 1 as one of the stored values 154 therein).

In various embodiments, if it is determined in step 214 that the vehicle is not being held at a stop (e.g., that the velocity is not equal to zero or that the velocity is not less than a predetermined threshold that is at least approximately equal to zero), then the driver is allowed to override an automated control action of the vehicle upon request of the drive when the vehicle is not being held at a stop (step 216). Specifically, in various embodiments, during step 216, the processor 142 does not make automatic adjustments to braking for the vehicle 100, and allows the driver of the vehicle to override an automated control action of the vehicle upon request of the drive (including braking) via the input devices 105 of FIG. 1 when the vehicle is not being held at a stop. In various embodiments, the process then proceeds to step 234, described in greater detail further below.

Conversely, if it is instead determined in step 214 that the vehicle is being held at a stop (e.g., that the velocity is equal to zero or that the velocity is less than a predetermined threshold that is at least approximately equal to zero), then the process proceeds to step 216, described below.

During step 216, a determination is made as to whether the vehicle was secured by the brakes. In various embodiments, during step 216, a determination is made as to whether the vehicle 100 was being secured by the friction brakes 108 of FIG. 1 before the loss of friction braking (e.g., immediately or substantially immediately before the loss of friction braking). In various embodiments, this determination is made by the processor 142 of FIG. 1.

If it is determined during step 216 that the vehicle was not secured by the brakes, then the process proceeds to step 218. During step 218, the park system 113 of FIG. 1 is automatically shifted into the "Park" park system gear via instructions provided by the processor 142 of FIG. 1. In various embodiments, the process then proceeds to step 234, described in greater detail further below.

Conversely, if it is determined during step 216 that the vehicle was secured by the brakes, then the process proceeds instead to step 220, described below.

During step 220, a determination is made as to whether the vehicle is in park. In various embodiments, during step 220, a determination is made as to whether the park system 113 of FIG. 1 is currently in the "Park" gear. In various embodiments, this determination is made by the processor 142 of FIG. 1.

If it is determined during step 220 that the vehicle is in park, then a determination is made that the vehicle is secured (step 221). Specifically, in various embodiments, during step 221, the processor 142 does not make adjustments to braking for the vehicle 100. In various embodiments, the process then proceeds to step 234, described in greater detail further below.

Conversely, if it is determined during step 221 that the vehicle is not in park, then the process instead to step 224, described below.

During step 224, a determination is made as to whether the vehicle is rolling. In various embodiments, during step 224, a determination is made as to whether a speed of the vehicle 100 is greater than a predetermined threshold. In various embodiments, this determination is made by the processor 142 of FIG. 1 based on sensor data from the wheel sensors 122 and/or motor sensors 124 with respect to a predetermined speed value that is stored in the memory 144 of FIG. 1 as a stored value 154 thereof.

If it is determined during step 224 that the vehicle is not rolling, then the process proceeds to step 226. During step 226, a current amount of propulsion torque is held (i.e., maintained) until the vehicle is in park. Specifically, in various embodiments, during step 226, the processor 142 of FIG. 1 provides instructions for the motor 111 to continue to provide the same amount of propulsion torque (as the motor 111 has already been providing in step 206), and these instructions are implemented by the motor 111 to secure the vehicle 100 at a stop. In various embodiments, the process then proceeds to step 234, described in greater detail further below.

Conversely, if it is instead determined during step 224 that the vehicle is rolling, then the process proceeds instead to step 228. During step 228, a determination is made as to whether the vehicle is rolling backwards. Specifically, in various embodiments, during step 228, the processor 142 of FIG. 1 determines whether the vehicle 100 is moving backwards based on sensor data obtained from the wheel sensors 122 and/or motor sensors 124 of FIG. 1.

If it is determined during step 228 that the vehicle is not rolling backwards, then the process proceeds to step 230. During step 230, negative propulsion torque is added until the vehicle comes to a stop, and then the vehicle then shifts to park. Specifically, in various embodiments, during step 230, the processor 142 of FIG. 1 provides instructions for the motor 111 to provide negative propulsion torque, and these instructions are implemented by the motor 111 to decrease the forward rolling speed of the vehicle 100 until the vehicle 100 comes to the stop. Also in various embodiments during step 230, the processor 142 then provides instructions for the park system 113 of FIG. 1 to move to the "Park" gear. In various embodiments, the process then proceeds to step 234, described in greater detail further below.

Conversely, if it is instead determined during step 228 that the vehicle is moving backwards, then the process proceeds instead to step 232. During step 232, positive propulsion torque is added until the vehicle comes to a stop, and then the vehicle then shifts to park. Specifically, in various embodiments, during step 232, the processor 142 of FIG. 1 provides instructions for the motor 111 to provide positive propulsion torque, and these instructions are implemented by the motor 111 to decrease the backward rolling speed of the vehicle 100 until the vehicle 100 comes to the stop. Also in various embodiments during step 232, the processor 142 then provides instructions for the park system 113 of FIG. 1 to move to the "Park" gear. In various embodiments, the process then proceeds to step 234, described in greater detail further below.

In various embodiments, during step 234, a determination is made as to whether the process is to continue. Specifically, in certain embodiments, the processor 142 of FIG. 1 determines whether the vehicle 100 is currently being operated by a user during a vehicle drive or driving cycle. In various embodiments, this determination is made throughout the process 200.

In various embodiments, when it is determined at step 234 that the process is to continue (e.g., the at the current vehicle drive is continuing), then the process 200 returns to step 204 and then continues with a new iteration. Conversely, also in various embodiments, when it is determined during at iteration of step 234 that the process is not to continue (e.g., that the current vehicle drive has ended), then the process terminates at step 236.

Accordingly, methods, systems, and vehicles are provided for securing a vehicle. In various embodiments, motor propulsion torque is provided in order to secure a vehicle when there is a loss in friction brakes, in accordance with determinations and instructions made by a computer processor of the vehicle. The methods, systems, and vehicles provided herein allow for securing a vehicle even when the vehicle is on a hill and/or significant with friction brake failure.

In certain embodiments, the methods, systems, and vehicles provided herein are implemented in connection with a vehicle and braking system that includes functionality of one-pedal driving, for example in which a driver utilizes a single pedal for both braking and acceleration (e.g., in which a drive engages the pedal for acceleration and releases the pedal for braking in one exemplary embodiment, among other possible embodiments).

It will be appreciated that the systems, vehicles, and methods may vary from those depicted in the Figures and described herein. For example, the vehicle 100 of FIG. 1, the control system 102 thereof, and/or components thereof of FIG. 1 may vary in different embodiments. It will similarly be appreciated that the steps of the process 200 may differ from that depicted in FIG. 2, and/or that various steps of the process 200 may occur concurrently and/or in a different order than that depicted in FIG. 2.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A method for securing a vehicle, the method comprising:
   determining, via a processor, that a loss in friction braking has occurred while the vehicle is being stopped;
   providing propulsion torque using a motor of the vehicle in accordance with instructions provided by the processor, thereby securing the vehicle at a stop, when it is determined that the loss in friction braking has occurred;
   determining, via the processor, whether the vehicle is being held at a stop;
   allowing a driver of the vehicle to override an automated control action of the vehicle upon request of the driver when the vehicle is not being held at a stop;
   determining, via the processor, whether the vehicle was previously secured by friction brakes; and
   automatically shifting a park system of the vehicle to a park gear, in accordance with instructions provided by the processor, when it is determined that both:
   the vehicle is being held at a stop; and
   the vehicle was not previously secured by the friction brakes.

2. The method of claim 1, wherein:
   the step of determining that the loss in friction braking has occurred comprises determining that communications have been lost with a braking system of the vehicle while the vehicle is being stopped; and
   the step of providing the propulsion torque comprises providing the propulsion torque using the motor of the vehicle in accordance with the instructions provided by the processor, thereby securing the vehicle at the stop, when it is determined that the communications have been lost with the braking system.

3. The method of claim 1, wherein the steps of the method are implemented in connection with the braking system of a vehicle with one-pedal driving.

4. The method of claim 1, further comprising:
   determining, via the processor, whether a park system of the vehicle is in a park gear;
   determining, via the processor, whether the vehicle is rolling; and
   when the park system is not in the park gear and the vehicle is not rolling, maintaining a current level of propulsion torque from the motor, via instructions provided by the processor, until the park system is in the park gear.

5. The method of claim 4, further comprising:
   when the park system is not in the park gear and the vehicle is rolling, adding propulsion torque from the motor, via instructions provided by the processor, until the vehicle comes to a stop and the park system is in the park gear.

6. The method of claim 5, further comprising:
   determining a direction in which the vehicle is rolling;
   when the park system is not in the park gear and the vehicle is rolling backwards, adding positive propulsion torque from the motor, via instructions provided by the processor, until the vehicle comes to a stop and the park system is in the park gear; and
   when the park system is not in the park gear and the vehicle is rolling forward, adding negative propulsion torque from the motor, via instructions provided by the processor, until the vehicle comes to a stop and the park system is in the park gear.

7. A system for securing a vehicle, the system comprising:
   a motor; and
   a processor that is coupled to the motor and configured to at least facilitate:
   determining that a loss in friction braking has occurred while the vehicle is being stopped; and
   providing instructions to the motor for providing propulsion torque, thereby securing the vehicle at a stop, when it is determined that the loss in friction braking has occurred;
   wherein the motor is further configured to execute the instructions provided by the processor for providing the propulsion torque; and
   wherein the processor is further configured to at least facilitate:
   determining whether the vehicle is being held at a stop;

allowing a driver of the vehicle to override an automated control action of the vehicle upon request of the driver when the vehicle is not being held at a stop;
determining whether the vehicle was previously secured by friction brakes; and
automatically shifting a park system of the vehicle to a park gear when it is determined that both:
the vehicle is being held at a stop; and
the vehicle was not previously secured by the friction brakes.

8. The system of claim 7, wherein the processor is further configured to at least facilitate:
determining that communications have been lost with a braking system of the vehicle while the vehicle is being stopped; and
providing the instructions to the motor for providing the propulsion torque, thereby securing the vehicle at the stop, when it is determined that the communications have been lost with the braking system.

9. The system of claim 7, wherein the processor is further configured to at least facilitate:
determining whether a park system of the vehicle is in a park gear;
determining whether the vehicle is rolling; and
when the park system is not in the park gear and the vehicle is not rolling, providing instructions to the motor for maintaining a current level of propulsion torque from the motor until the park system is in the park gear.

10. The system of claim 9, wherein the processor is further configured to at least facilitate:
when the park system is not in the park gear and the vehicle is rolling, providing instructions to the motor for adding propulsion torque until the vehicle comes to a stop and the park system is in the park gear.

11. The system of claim 10, wherein the processor is further configured to at least facilitate:
determining whether the vehicle is rolling backwards;
when the park system is not in the park gear and the vehicle is rolling backwards, providing instructions to the motor for adding positive propulsion torque from the motor until the vehicle comes to a stop and the park system is in the park gear; and
when the park system is not in the park gear and the vehicle is rolling forward, providing instructions to the motor for adding negative propulsion torque from the motor until the vehicle comes to a stop and the park system is in the park gear.

12. A vehicle comprising:
a body;
a drive system configured to generate movement of the body, the drive system including a motor;
a braking system comprising friction brakes that provide friction braking; and
a processor that is disposed onboard the vehicle and coupled to the motor, the processor configured to at least facilitate:
determining that a loss in friction braking has occurred while the vehicle is being stopped; and
providing instructions to the motor for providing propulsion torque, thereby securing the vehicle at a stop, when it is determined that the loss in friction braking has occurred;
wherein the motor is further configured to execute the instructions provided by the processor for providing the propulsion torque; and
wherein the processor is further configured to at least facilitate:
determining whether a park system of the vehicle is in a park gear,
determining whether the vehicle is rolling;
when the park system is not in the park gear and the vehicle is not rolling, providing instructions to the motor for maintaining a current level of propulsion torque from the motor until the park system is in the park gear; and
when the park system is not in the park gear and the vehicle is rolling, providing instructions to the motor for adding propulsion torque until the vehicle comes to a stop and the park system is in the park gear.

13. The vehicle of claim 12, wherein the processor is further configured to at least facilitate:
determining that communications have been lost with the braking system of the vehicle while the vehicle is being stopped; and
providing the instructions to the motor for providing the propulsion torque, thereby securing the vehicle at the stop, when it is determined that the communications have been lost with the braking system.

14. The vehicle of claim 12, wherein the processor is further configured to at least facilitate:
determining whether the vehicle is being held at a stop;
allowing a driver of the vehicle to override an automated control action of the vehicle upon request of the drive when the vehicle is not being held at a stop;
determining whether the vehicle was previously secured by the friction brakes; and
automatically shifting a park system of the vehicle to a park gear when it is determined that both:
the vehicle is being held at a stop; and
the vehicle was not previously secured by the friction brakes.

15. The vehicle of claim 12, wherein the processor is further configured to at least facilitate:
determining whether the vehicle is rolling backwards;
when the park system is not in the park gear and the vehicle is rolling backwards, providing instructions to the motor for adding positive propulsion torque from the motor until the vehicle comes to a stop and the park system is in the park gear; and
when the park system is not in the park gear and the vehicle is rolling forward, providing instructions to the motor for adding negative propulsion torque from the motor until the vehicle comes to a stop and the park system is in the park gear.

16. The method of claim 1, wherein the method is implemented in connection with an automobile.

17. The system of claim 7, wherein the motor and the processor are configured for implementation in an automobile.

18. The system of claim 7, wherein the motor and the processor are implemented in connection with the braking system of the vehicle with one-pedal driving.

19. The vehicle of claim 12, wherein the vehicle comprises an automobile.

20. The vehicle of claim 12, wherein the vehicle is equipped with one pedal driving in which the motor and the processor are implemented.

* * * * *